(No Model.)

C. T. FREEMAN.
GUIDE SETTER FOR SEWING MACHINES.

No. 312,196. Patented Feb. 10, 1885.

WITNESSES:

INVENTOR:
C. T. Freeman
BY Munn & Co.
ATTORNEYS.

UNITED STATES PATENT OFFICE.

CORNELIA T. FREEMAN, OF ELIZABETH, NEW JERSEY.

GUIDE-SETTER FOR SEWING-MACHINES.

SPECIFICATION forming part of Letters Patent No. 312,196, dated February 10, 1885.

Application filed July 1, 1884. (No model.)

*To all whom it may concern:*

Be it known that I, CORNELIA T. FREEMAN, of Elizabeth, in the county of Union and State of New Jersey, have invented a new and Improved Guide-Setter for Sewing-Machines, of which the following is a full, clear, and exact description.

This invention consists, principally, of a graduated plate adapted to be secured to the cloth-plate of a sewing-machine to serve as a guide in setting the ordinary gage or cloth-guide used in stitching hems, tucks, and other seams of uniform width.

The invention also consists in providing the graduated plate with a pivoted pointer for designating the position of the cloth-guide upon the graduated plate, whereby, in case the work is temporarily suspended and the machine used for other stitching, the cloth-guide may be easily and accurately readjusted to resume the work without the inconvenience of measuring for the hem, tuck, or other seam.

The invention also consists in providing the graduated plate with a stud upon its under surface adapted to enter an orifice or seat in the cloth-plate of the sewing-machine for always insuring the proper parallelism of the plate and cloth-guide with the movement of the feed of the machine.

Reference is to be had to the accompanying drawings, forming a part of this specification, in which similar letters of reference indicate corresponding parts in both the figures.

Figure 1:
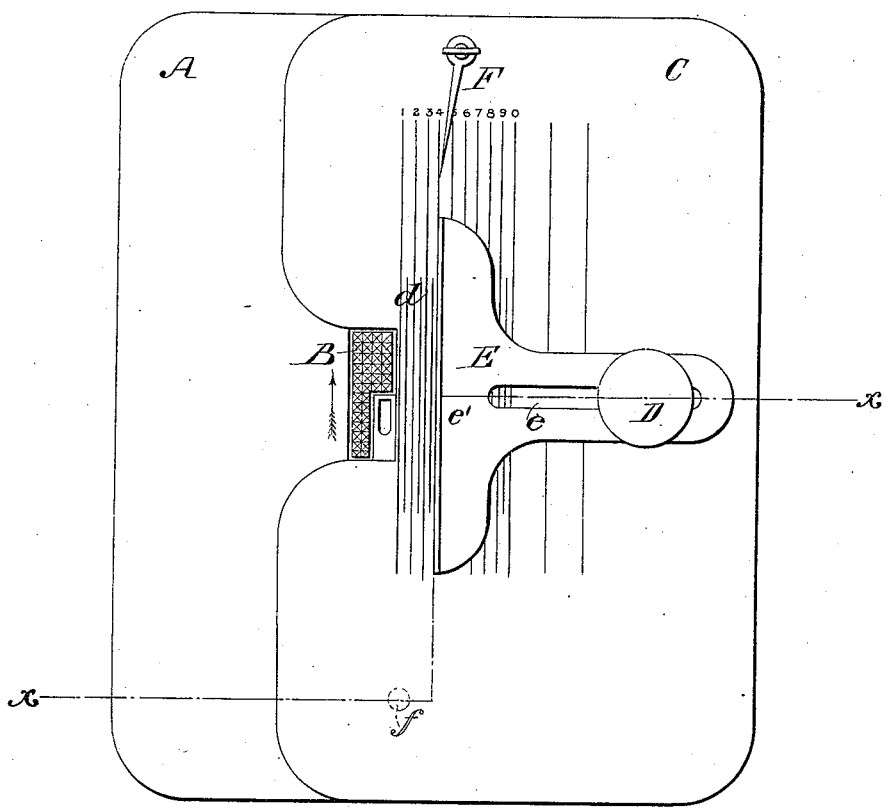
Figure 2:
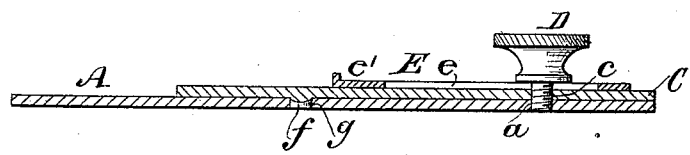

Figure 1 shows a plan view of my invention applied to a cloth-plate of a sewing-machine, the cloth-guide and feed of the sewing-machine being shown in the figure; and Fig. 2 is a sectional elevation taken on the line $x$ $x$ of Fig. 1.

A and B in the drawings refer to the cloth-plate and feed of a sewing-machine. Upon the plate A is secured by the screw D my new guide-setting plate C, the screw passing through the orifice $c$ in the setting-plate and screwing into the screw-threaded opening $a$ made in the cloth-plate A; and the screw D in this instance also serves to hold the gage or cloth-guide E upon the upper surface of the plate C, the shank of the screw passing through the slot $e$ of the guide before entering the orifice $c$. The plate C is graduated upon its upper surface, as shown at $d$, with lines drawn parallel with the direction of the feed of the sewing-machine, and upon the plate is pivoted the pointer F, which is adapted to be turned to designate any of the lines or marks of the graduations $d$.

Upon the under surface of the plate C is formed the pin or stud $f$, which is adapted to enter the orifice or seat $g$ made in the cloth-plate A, as shown clearly in Fig. 2, to always insure the plate C being put in proper position upon the plate A, so that when the cloth-guide E is placed with its straight edge $e'$ the proper distance from the needle of the sewing-machine, and parallel with the marks of graduation $d$, and secured, the straight edge $e'$ of the guide will always stand exactly parallel with the direction of the feed of the sewing-machine.

The graduation-marks $d$ may be drawn to any scale desired to assist in setting the guide E for stitching hems, tucks, or other seams of any desired width; and the graduation-marks, being drawn parallel with the direction of the feed, greatly assist in setting the guide E parallel to the feed-movement, and when the work with the guide E is to be discontinued, to be resumed again, the pointer F should be turned to the graduation-mark coinciding with the straight edge of the gage, so that no difficulty will be experienced in readjusting the gage E to its former position upon the plate C. In this manner the guide-setting plate serves a very convenient purpose, and it is cheap and practical and may be applied to sewing-machines already in use.

Having thus described my invention, I claim as new and desire to secure by Letters Patent—

1. The guide-setting plate C, formed with opening $c$, and having the graduations $d$ formed upon its upper surface, in combination with the guide-plate E, having the slot $e$, and screw D for securing the plates C and E upon the cloth-plate A of a sewing-machine, substantially as described.

2. The combination, with the plate C, having the graduations $d$, of the pointer F, pivoted to the plate C, substantially as and for the purposes set forth.

3. The plate C, formed with the stud $f$ and graduated at $d$, in combination with the guide E and pointer F, arranged substantially as and for the purposes set forth.

CORNELIA T. FREEMAN.

Witnesses:
H. A. WEST,
C. SEDGWICK.